United States Patent
Gotou et al.

(10) Patent No.: US 10,554,165 B2
(45) Date of Patent: Feb. 4, 2020

(54) MOTOR DRIVE APPARATUS INCLUDING SHORT-CIRCUIT JUDGMENT UNIT FOR CAPACITOR OF DC LINK UNIT

(71) Applicant: FANUC CORPORATION, Yamanashi (JP)

(72) Inventors: Yuuta Gotou, Yamanashi (JP); Yasuyuki Matsumoto, Yamanashi (JP); Masaya Tateda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/267,790

(22) Filed: Feb. 5, 2019

(65) Prior Publication Data

US 2019/0245474 A1    Aug. 8, 2019

(30) Foreign Application Priority Data

Feb. 6, 2018  (JP) ................. 2018-019407

(51) Int. Cl.
| | |
|---|---|
| G05B 5/00 | (2006.01) |
| H02H 7/08 | (2006.01) |
| H02P 29/00 | (2016.01) |
| H02P 23/14 | (2006.01) |
| H02P 27/06 | (2006.01) |

(52) U.S. Cl.
CPC .............. *H02P 29/00* (2013.01); *H02P 23/14* (2013.01); *H02P 27/06* (2013.01)

(58) Field of Classification Search
CPC ................................. H02P 29/00; H02P 23/14
USPC .......................................................... 318/445
See application file for complete search history.

(56) References Cited

U.S. PATENT DOCUMENTS

2013/0208516 A1    8/2013    Kusunoki et al.

FOREIGN PATENT DOCUMENTS

| JP | H7-222436 A | 8/1995 |
|---|---|---|
| JP | 2007-60866 A | 3/2007 |
| JP | 2007-116790 A | 5/2007 |
| JP | 2009092505 A | 4/2009 |
| JP | 2010142066 A | 6/2010 |
| JP | 2016-116432 A | 6/2016 |
| WO | 2011161730 A1 | 12/2011 |
| WO | 2017/137128 A1 | 8/2018 |

*Primary Examiner* — Erick D Glass
(74) *Attorney, Agent, or Firm* — Hauptman Ham, LLP

(57) ABSTRACT

A motor drive apparatus includes a converter configured to convert AC power of an AC power supply into DC power and outputs the DC power, a DC link unit including capacitors connected in series with each other, an inverter connected in parallel with the DC link unit, and configured to convert the DC power of the DC link unit into AC power for driving a motor, and outputs the AC power, and a short-circuit judgment unit configured to judge that at least one of the capacitors in the DC link unit has shorted in the case where, when the value of a voltage applied to a positive and negative bipolar terminal of the DC link unit is smaller than a first threshold, the value of an input current flowing from the AC power supply into the DC link unit via the converter is larger than a second threshold.

8 Claims, 4 Drawing Sheets

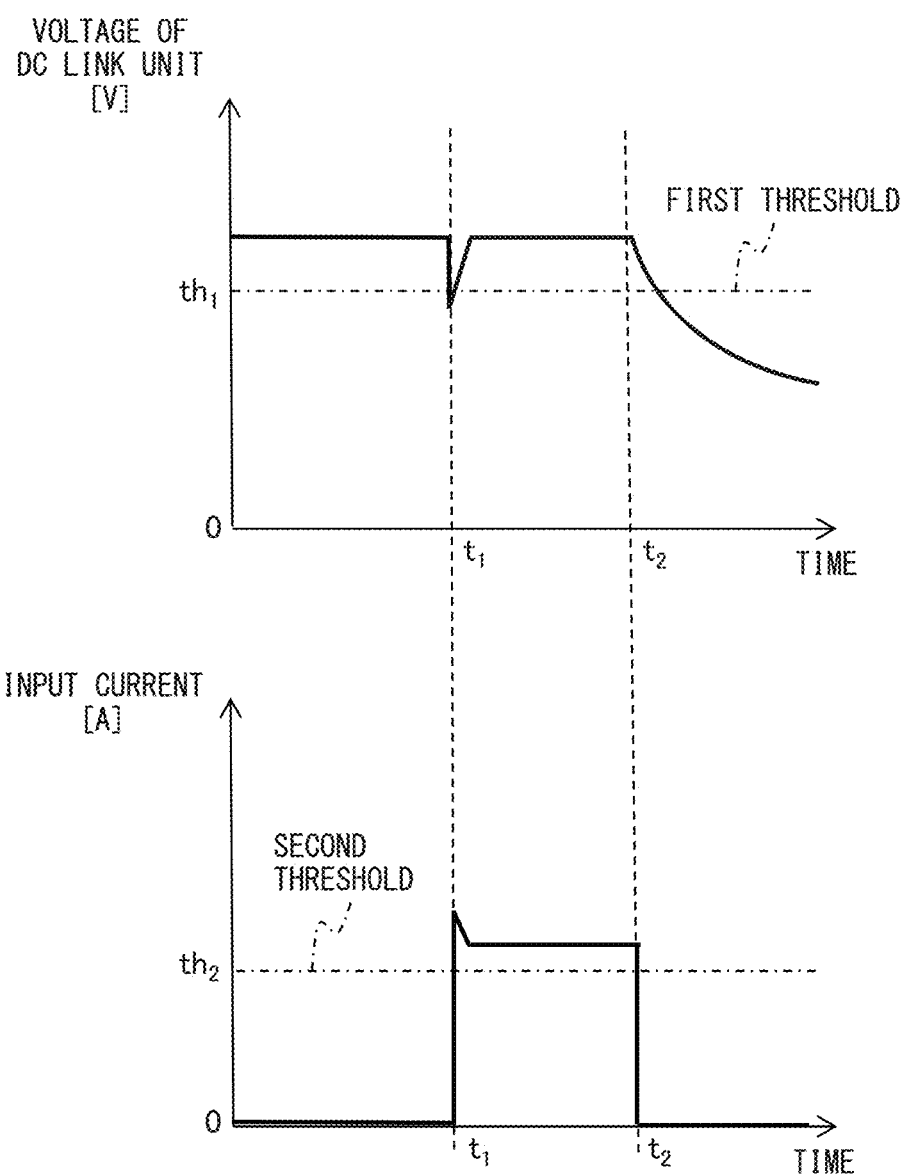

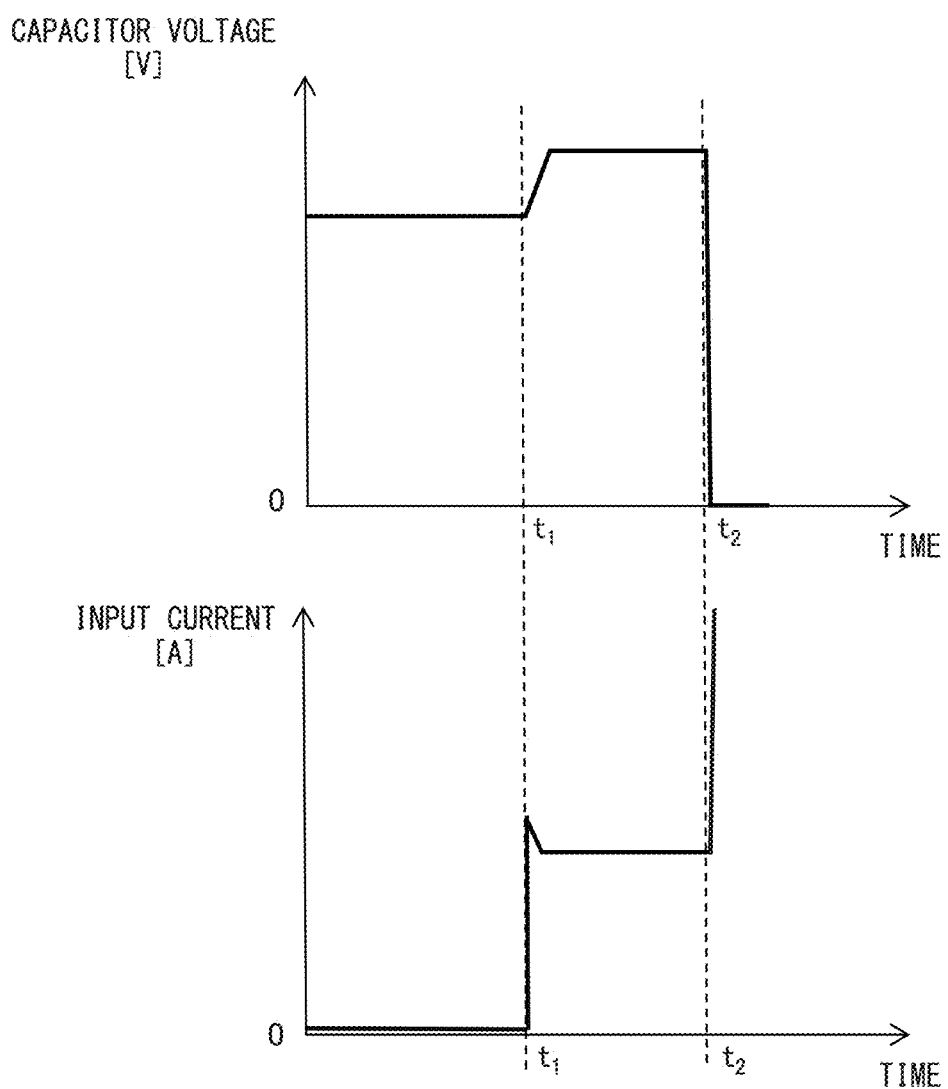

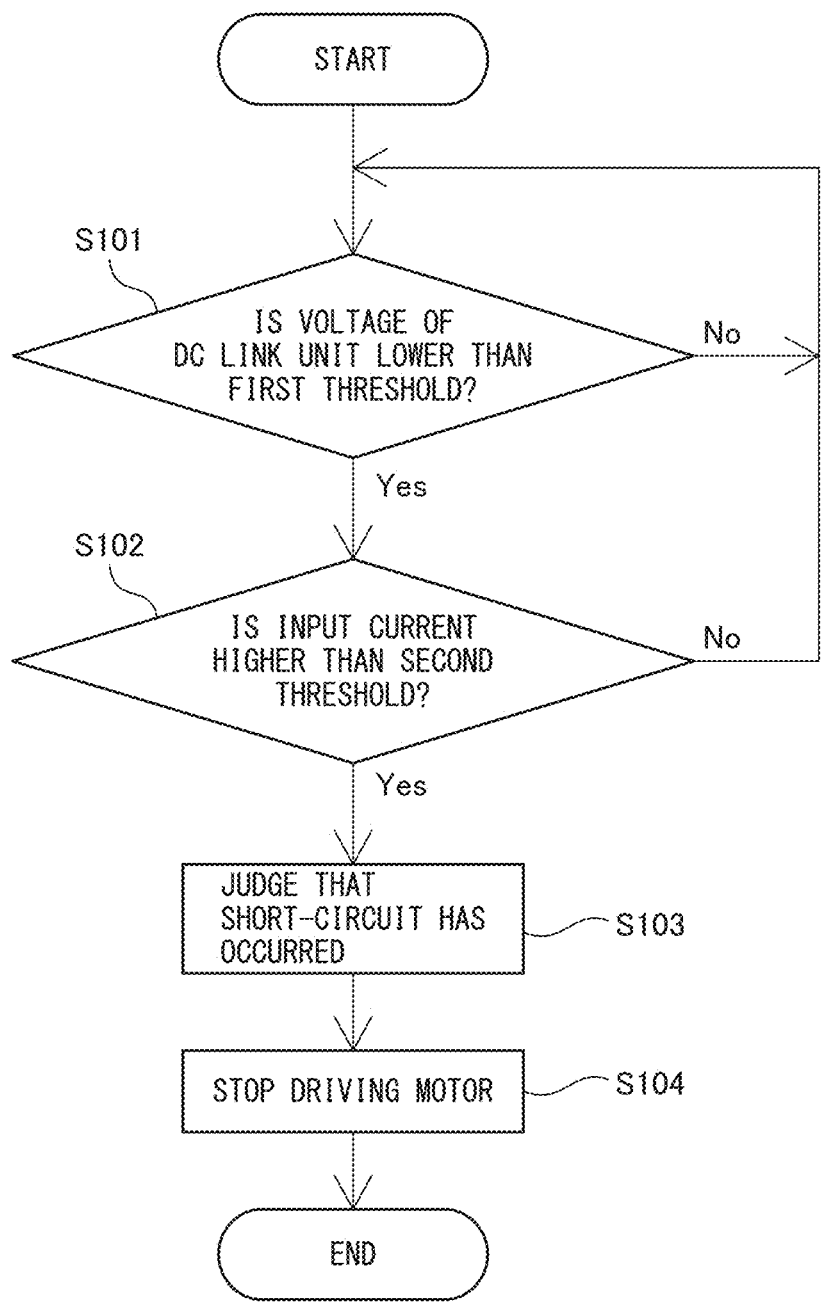

MOTOR DRIVE APPARATUS INCLUDING SHORT-CIRCUIT JUDGMENT UNIT FOR CAPACITOR OF DC LINK UNIT

RELATED APPLICATIONS

The present application claims priority of Japanese Application Number 2018-019407 filed Feb. 6, 2018, the disclosure of which is hereby incorporated by reference herein in its entirety.

BACKGROUND OF THE INVENTION

1. Field of the Invention

The present invention relates to a motor drive apparatus including a short-circuit judgment unit for a capacitor of a DC link unit.

2. Description of the Related Art

In a motor drive apparatus which drives motors in a machine tool, forging machinery, an injection molding machine, industrial machinery, or various robots, AC power supplied from an AC power supply is converted into DC power and output to a DC link unit by a converter (rectifier), the DC power in the DC link unit is further converted into AC power by an inverter, and the AC power is supplied to the motor provided for each drive axis as drive power.

The DC link unit includes a capacitor having the function of suppressing pulsation of the DC output of the converter and the function of storing DC power. Such a capacitor is also called a DC link capacitor or a smoothing capacitor. Since a capacitor is generally resistant to voltage, capacitors may be connected in series with each other to withstand a high DC voltage in the DC link unit.

As disclosed in, e.g., International Publication WO 2011/161730, a power conversion apparatus is known to include a converter which converts an AC voltage of an AC power supply into a DC voltage, N (N is an integer of 2 or more) capacitors connected in series with each other to smooth the DC voltage and defined as a first capacitor, a second capacitor, ..., an Nth capacitor from a high potential side, and a capacitor abnormality detection circuit which detects short-circuit failure of one of the N capacitors, the capacitor abnormality detection circuit including N switch circuits which include excitation circuits, and contact circuits having contact points closed by excitation currents of the excitation circuits and are defined as a first switch circuit, a second switch circuit, ..., an Nth switch circuit from a high potential side, N excitation resistors connected alternately in series with the respective excitation circuits of the N switch circuits, and N contact resistors connected alternately in series with the respective contact circuits of the N switch circuits, wherein one end of each of the excitation circuit and the contact circuit of the first switch circuit is connected to the high potential side of the first capacitor, the contact point between a first excitation resistor connected to the first switch circuit and the excitation circuit of the second switch circuit is defined as a first contact point, the contact point between a first contact resistor connected to the first switch circuit and the contact circuit of the second switch circuit is connected to the first contact point, and a first diode is further connected to the first contact point in a direction in which a current is supplied from the first contact point to the high potential side of the second capacitor, connections are similarly established in sequence as follows: the contact point between a Kth contact resistor connected to the Kth switch circuit and the contact circuit of the (K+1)th switch circuit is connected to a Kth $\{(K=2, 3, \ldots, (N-1)\}$ contact point, and a Kth diode is connected to the Kth contact point in a direction in which a current is supplied from the Kth contact point to the high potential side of the (K+1)th capacitor, the other end of an Nth excitation resistor connected to the Nth switch circuit and the other end of an Nth contact resistor connected to the Nth switch circuit are connected to a low potential side of the Nth capacitor, and when excitation of the Nth switch circuit is turned off during operation of the converter, it is judged that at least one of the N capacitors has shorted.

As disclosed in, e.g., Japanese Unexamined Patent Publication No. 2010-142066, a robot is known to include a robot body having an axis driven by a motor, a DC power supply device including a rectifier which rectifies an AC voltage applied from an AC power supply, and a first capacitor and a second capacitor connected in series with each other between a pair of DC power supply lines connected to respective output terminals of the rectifier, a power supply opening and closing means including an openable and closable power supply path leading from the AC power supply to the DC power supply device, an inverter device which drives the motor by inputting a DC voltage across the DC power supply lines, an AC voltage input unit which divides and inputs the voltage of the AC power supply, a capacitor voltage detection unit which detects a voltage across terminals of the first capacitor connected to the DC power supply line on a low potential side, and a control circuit which monitors instantaneous power failure of the AC power supply, based on the AC voltage input by the AC voltage input unit, and controls opening and closing of the power supply opening and closing means, the control circuit including a maximum value detection unit which detects a maximum value of the AC voltage input by the AC voltage input unit with reference to a potential of the DC power supply line on the low potential side, and a capacitor voltage estimation unit which estimates a voltage across terminals of the second capacitor by subtracting a value of the voltage across the terminals of the first capacitor detected by the capacitor voltage detection unit from the maximum value, wherein the detected value of the voltage across the terminals of the first capacitor or the estimated value of the voltage across the terminals of the second capacitor is compared with a threshold voltage set higher than a rated resistance of each capacitor, and the power supply opening and closing means is opened when at least one of the values of the voltages across the terminals of the each capacitor is higher than the threshold voltage.

As disclosed in, e.g., Japanese Unexamined Patent Publication No. 2009-92505, a capacitor failure detection circuit for a capacitor circuit formed by a plurality of parallel-connected sets of capacitor circuit units each including two series-connected parallel circuits each including a capacitor and a balancing resistor is known in which the balancing resistor connected in parallel with one capacitor of the capacitor circuit unit includes a plurality of resistors, the capacitor failure detection circuit includes a voltage detection means for detecting a drop in a voltage of one resistor of the plurality of resistors, and a capacitor abnormality detection means, having a lower limit threshold and an upper limit threshold larger than the lower limit threshold, for judging an abnormality of one of the capacitors of the capacitor circuit unit when the voltage detected by the voltage detection means is lower than the lower limit threshold, and judging an abnormality of one of the capacitors of the capacitor circuit unit when the voltage is higher than the upper limit threshold, and at least the lower limit threshold changes in proportion to a DC voltage applied to the capacitor circuit unit.

SUMMARY OF INVENTION

When short-circuit failure occurs in one of series-connected capacitors provided in a DC link unit between a converter and an inverter in a motor drive apparatus, a voltage higher than previously is applied to normal capacitors having no short-circuit failure. When the high voltage applied to the normal capacitors is equal to or greater than the capacitor resistance, or the high voltage is continuously applied for a long time, the capacitors applied with the high voltage may break or fire. As a result, a motor, a motor drive apparatus which drives the motor, a tool connected to the motor driven by the motor drive apparatus, an object to be machined by the tool, or a production line including the motor drive apparatus, for example, may suffer any type of failure such as breakage or deformation. To solve this problem, it is very important to early detect short-circuit failure of the capacitors provided in the DC link unit. For example, short-circuit failure may be detected by constantly monitoring the voltage applied to each of the series-connected capacitors. However, providing a voltage monitoring circuit for each individual capacitor undesirably leads to an increase in number of parts, addition of a circuit, and eventually, a rise in cost. Therefore, a demand has arisen for a technique capable of detecting short-circuit failure of series-connected capacitors provided in a DC link unit between a converter and an inverter in a motor drive apparatus, at low cost without an additional circuit.

According to one aspect of the present disclosure, a motor drive apparatus includes a converter configured to convert AC power input from an AC power supply into DC power and outputs the DC power, a DC link unit including a plurality of capacitors connected in parallel with a DC output of the converter and connected in series with each other, an inverter connected in parallel with the DC link unit, and configured to convert the DC power in the DC link unit into AC power for driving a motor, and outputs the AC power, and a short-circuit judgment unit configured to compare a value of a voltage applied to a positive and negative bipolar terminal of the DC link unit with a predefined first threshold, further compare a value of an input current flowing from the AC power supply into the DC link unit via the converter with a predefined second threshold, and judge that at least one of the plurality of capacitors in the DC link unit has shorted in a case where, when, as a result of comparison, the value of the voltage applied to the positive and negative bipolar terminal of the DC link unit is smaller than the first threshold, the value of the input current flowing from the AC power supply into the DC link unit via the converter is larger than the second threshold.

BRIEF DESCRIPTION OF THE DRAWINGS

The present invention will be more clearly understood with reference to the following accompanying drawings:

FIG. 2 is a graph illustrating exemplary short-circuit judgment processing in the motor drive apparatus according to this embodiment;

FIG. 3 is a graph illustrating an exemplary state of the occurrence of a capacitor short-circuit of a DC link unit in the conventional motor drive apparatus; and FIG. 4 is a flowchart illustrating the operation sequence of the motor drive apparatus according to the embodiment of the present disclosure.

DETAILED DESCRIPTION

Figure 1:
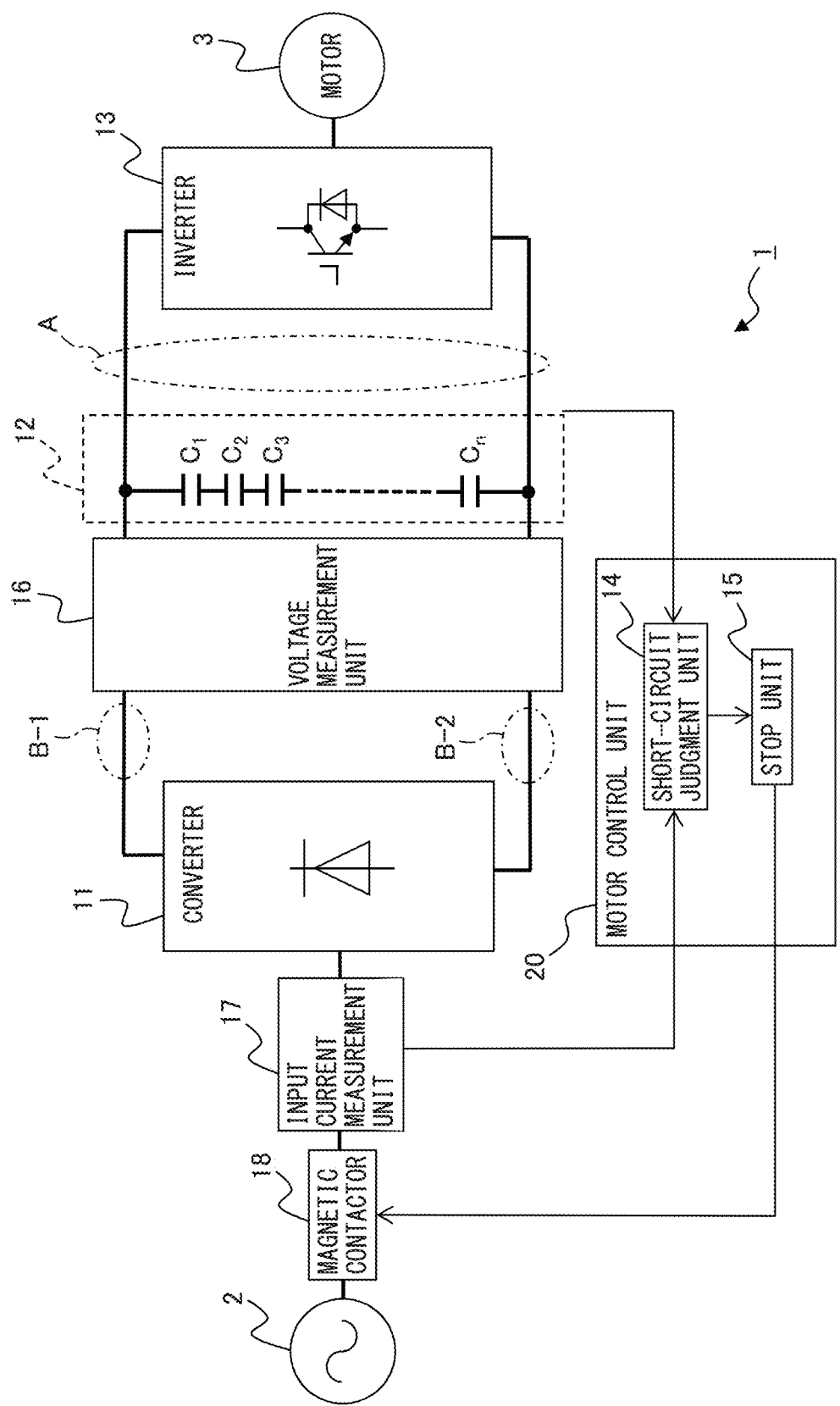
FIG. 1 is a diagram illustrating a motor drive apparatus according to an embodiment of the present disclosure.

A motor drive apparatus including a short-circuit judgment unit for a capacitor of a DC link unit will be described below with reference to the drawings. These drawings use different scales as appropriate to facilitate an understanding. The mode illustrated in each drawing is one example for carrying out the present invention, and the present invention is not limited to the embodiments illustrated in these drawings.

FIG. 1 is a diagram illustrating a motor drive apparatus according to an embodiment of the present disclosure.

The case where one AC motor of the single-winding type (to be simply referred to as a "motor" hereinafter) 3 is controlled by a motor drive apparatus 1 connected to an AC power supply 2 will be taken as an example below. The number of motors 3 does not particularly limit this embodiment and may be other than one, and the motor 3 may be of the multiple-winding type. An inverter 13 is provided for each winding of the motor 3. The inverter 13 is provided, for example, for each motor 3 when a plurality of motors 3 of the single-winding type are used, for each winding when one motor 3 of the multiple-winding type is used, or for each winding of each motor 3 when a plurality of motors 3 of the multiple-winding type are used. The numbers of phases of the AC power supply 2 and the motor 3 do not particularly limit this embodiment, and a three- or single-phase configuration, for example, may be used. The type of motor 3 does not particularly limit this embodiment, either, and an induction or synchronous motor, for example, may be used. Machines equipped with the motors 3 include, e.g., a machine tool, a robot, forging machinery, an injection molding machine, industrial machinery, various electrical appliances, an electric train, an automobile, and an aircraft.

The motor drive apparatus 1 controls an inverter 13 which converts power between the DC power of a DC link unit 12 and the AC power serving as drive power or regenerative power for the motor 3, like general motor drive apparatus. A motor control unit 20 in the motor drive apparatus 1 generates a switching command for controlling the speed, the torque, or the rotor position of the motor 3, based on, e.g., the (rotor) speed of the motor 3 (speed feedback), a current flowing through the winding of the motor 3 (current feedback), a predetermined torque command, and an operation program for the motor 3. A power conversion operation by the inverter 13 is controlled based on the switching command generated by the motor control unit 20.

The motor drive apparatus 1 includes a converter 11, a DC link unit 12, an inverter 13, a short-circuit judgment unit 14, and a stop unit 15, as illustrated in FIG. 1. The motor drive apparatus 1 further includes a voltage measurement unit 16 and an input current measurement unit 17. The motor drive apparatus 1 may even include a magnetic contactor 18.

The converter 11 converts AC power input from the AC power supply 2 into DC power and outputs the DC power to the DC side. Examples of the converter 11 may include a diode rectifier circuit, a 120-degree conduction rectifier circuit, and a PWM switching control rectifier circuit including a switching element. The converter 11 serves as a three-phase bridge circuit when the AC power supply 2 has a three-phase configuration, and as a single-phase bridge circuit when the AC power supply 2 has a single-phase configuration. When the converter 11 serves as a diode rectifier circuit, it rectifies an alternating current input from the AC power supply 2 and outputs a direct current to the DC link unit 12 on the DC side. When the converter 11 serves as a 120-degree conduction rectifier circuit or a PWM switching control rectifier circuit, it is implemented as a bidirectional AC/DC-convertible power converter which can convert AC power input from the AC power supply 2 into DC power and output the DC power to the DC side, and can convert the DC power in the DC link unit 12 into AC power and return the AC power to the AC power supply 2 during motor deceleration. When the converter 11 serves as a PWM switching control rectifier circuit, it is implemented in a bridge circuit of switching elements and diodes connected in antiparallel with the switching elements. In this case, examples of the switching element may include an IGBT, a thyristor, a GTO (Gate Turn-OFF thyristor), and a transistor, but the type of switching element itself does not limit this embodiment, and other types of switching elements may be used.

The DC link unit 12 is connected in parallel with the DC output of the converter 11 and the DC input of the inverter 13. The DC link unit 12 includes capacitors $C_1$ to $C_n$ (n is an integer of 2 or more) connected in series with each other. The capacitors $C_1$ to $C_n$ in the DC link unit 12 have the function of suppressing pulsation of the DC output of the converter 11 and the function of storing DC power.

The inverter 13 is connected in parallel with the DC link unit 12, converts the DC power in the DC link unit 12 into AC power for driving the motor 3, and outputs the AC power. The inverter 13 is implemented in a bridge circuit of switching elements and diodes connected in antiparallel with the switching elements. The inverter 13 serves as a three-phase bridge circuit when the motor 3 has a three-phase configuration, and as a single-phase bridge circuit when the motor 3 has a single-phase configuration. The inverter 13 converts power between the DC power in the DC link unit 12 and the AC power serving as drive power or regenerative power for the motor 3, by ON/OFF control of each switching element based on the switching command received from the motor control unit 20. More specifically, the inverter 13 performs the switching operation of the internal switching elements, based on the switching command received from the motor control unit 20, to convert DC power supplied from the converter 11 via the DC link unit 12 into AC power having a desired voltage and a desired frequency for driving the motor 3 and output the AC power (inversion operation). The motor 3 thus operates based on the supplied variable-voltage, variable-frequency AC power. Regenerative power occurs during deceleration of the motor 3, but the switching operation of the internal switching elements is performed based on the switching command received from the motor control unit 20, to convert the AC regenerative power occurring in the motor 3 into DC power and return the DC power to the DC link unit 12 (rectification operation). Examples of the switching element may include an IGBT, a thyristor, a GTO, and a transistor, but the type of switching element itself does not limit this embodiment, and other types of switching elements may be used.

The short-circuit judgment unit 14 compares the value of a voltage applied to a positive and negative bipolar terminal of the DC link unit 12 with a predefined first threshold $th_1$, further compares the value of an input current flowing from the AC power supply 2 into the DC link unit 12 via the converter 11 with a predefined second threshold $th_2$, and judges that at least one of the capacitors $C_1$ to $C_n$ in the DC link unit 12 has shorted in the case where it detects that, when, as a result of comparison, the value of the voltage applied to the positive and negative bipolar terminal of the DC link unit 12 is smaller than the first threshold $th_1$, the value of the input current flowing from the AC power supply 2 into the DC link unit 12 via the converter 11 is larger than the second threshold $th_2$. The voltage applied to the positive and negative bipolar terminal of the DC link unit 12 is the potential difference between the positive terminal of the capacitor $C_1$ and the negative terminal of the capacitor $C_n$. The voltage applied to the positive and negative bipolar terminal of the DC link unit 12 will be simply referred to as the "DC link unit voltage" hereinafter. Short-circuit judgment processing of the short-circuit judgment unit 14 will be described in more detail as follows.

In a normal state in which none of the capacitors $C_1$ to $C_n$ in the DC link unit 12 have short-circuit failure, when the motor 3 is driven by controlling the power conversion operation of the inverter 13 by the motor control unit 20, the DC link unit voltage (the potential difference between the positive terminal of the capacitor $C_1$ and the negative terminal of the capacitor $C_n$) is nearly constant. In this case, when one of the capacitors $C_1$ to $C_n$ shorts, the value of the DC link unit voltage temporarily considerably drops, and the value of the input current flowing from the AC power supply 2 into the DC link unit 12 via the converter 11 temporarily increases. Under the circumstances, in this embodiment, it is determined whether, when the value of the DC link unit voltage has temporarily considerably dropped, the value of the input current flowing from the AC power supply 2 into the DC link unit 12 via the converter 11 has temporarily increased, and it is judged that at least one of the capacitors $C_1$ to $C_n$ has shorted in the case where, when the value of the DC link unit voltage has temporarily considerably dropped, the value of the input current flowing from the AC power supply 2 into the DC link unit 12 via the converter 11 has temporarily increased.

Hence, in this embodiment, to detect a temporary considerable drop in value of the DC link unit voltage, i.e., the voltage applied to the positive and negative bipolar terminal of the DC link unit 12, a voltage value smaller than the voltage applied to the positive and negative bipolar terminal of the DC link unit 12 in the steady state is set as the first threshold $th_1$ in advance. The "voltage applied to the positive and negative bipolar terminal of the DC link unit 12 in the steady state" is the DC link unit voltage maintained nearly constant when, for example, normal driving such as acceleration, deceleration, and constant-speed rotation of the motor 3 is performed by controlling the power conversion operation of the inverter 13 by the motor control unit 20. The DC link voltage slightly pulsates and fluctuates up and down even in the steady state during motor driving, but the first threshold $th_1$ is preferably set to a value smaller than the DC link voltage dropped due to pulsation in the steady state during motor driving.

In this embodiment, to further detect a temporary increase in value of the input current flowing from the AC power supply 2 into the DC link unit 12 via the converter 11 when the value of the DC link unit voltage temporarily considerably drops, a current value larger than the input current flowing from the AC power supply 2 into the DC link unit 12 via the converter 11 in the steady state is set as the second threshold $th_2$ in advance. The "input current flowing from the AC power supply 2 into the DC link unit 12 via the converter 11 in the steady state" is the input current steadily flowing when, for example, the motor 3 is driven by controlling the power conversion operation of the inverter 13 by the motor control unit 20. When normal driving such as acceleration, deceleration, and constant-speed rotation of the motor 3 is performed, especially during acceleration and deceleration of the motor 3, the input current may pulsate and fluctuate up and down. Therefore, to discriminate between a fluctuation in input current during normal acceleration and deceleration of the motor 3 and a fluctuation in input current occurring when one of the capacitors suffers short-circuit failure, the second threshold $th_2$ is preferably set to a value larger than the input current increased due to pulsation in the steady state during motor driving (e.g., during normal acceleration and deceleration of the motor 3). As long as, for example, the motor 3 is accelerated and decelerated as normal with all the capacitors having no short-circuit failure, and the input current flowing from the AC power supply 2 into the DC link unit 12 via the converter 11 is then observed, the "input current increased due to pulsation in the steady state during motor driving" can be determined, and the second threshold $th_2$ need only be set to a value larger than that of the input current observed during the normal acceleration and deceleration of the motor 3.

In this manner, the short-circuit judgment unit 14 compares the value of a voltage applied to a positive and negative bipolar terminal of the DC link unit 12 with a predefined first threshold $th_1$, further compares the value of an input current flowing from the AC power supply 2 into the DC link unit 12 via the converter 11 with a predefined second threshold $th_2$, and judges that at least one of the capacitors $C_1$ to $C_n$ in the DC link unit 12 has shorted in the case where it detects that, when, as a result of comparison, the value of the voltage applied to the positive and negative bipolar terminal of the DC link unit 12 is smaller than the first threshold $th_1$, the value of the input current flowing from the AC power supply 2 into the DC link unit 12 via the converter 11 is larger than the second threshold $th_2$.

A comparison in behavior between the motor drive apparatus 1 according to this embodiment and the conventional motor drive apparatus when one of capacitors connected in series with each other has shorted will be made herein.

FIG. 2 is a graph illustrating exemplary short-circuit judgment processing in the motor drive apparatus according to this embodiment. Referring to FIG. 2, the upper part represents an exemplary voltage of the DC link unit, and the lower part represents an exemplary input current flowing from the AC power supply into the DC link unit via the converter. FIG. 3 is a graph illustrating an exemplary state of the occurrence of a capacitor short-circuit of a DC link unit in the conventional motor drive apparatus. Referring to FIG. 3, the upper part represents an exemplary voltage of one capacitor, and the lower part represents an exemplary input current flowing from the AC power supply into the DC link unit via the converter.

In the motor drive apparatus 1 according to this embodiment, when the motor 3 is driven by controlling the power conversion operation of the inverter 13 by the motor control unit 20 free from any capacitor short-circuit, the value of the DC link unit voltage, i.e., the voltage applied to the positive and negative bipolar terminal of the DC link unit 12 is larger than the first threshold $th_1$, as illustrated in FIG. 2 (the waveform in the upper part of FIG. 2). When short-circuit failure occurs in one of the capacitors at, e.g., time $t_1$, the value of the voltage of the DC link unit 12 temporarily considerably drops, but after that, the voltage of the DC link unit 12 restores to that of the DC link unit 12 before the occurrence of the short-circuit failure (the waveform in the upper part of FIG. 2). Note, however, that a voltage higher than that before time $t_1$ is applied to capacitors having no short-circuit failure. In this case, the value of the input current flowing from the AC power supply 2 into the DC link unit 12 via the converter 11 temporarily increases (the waveform in the lower part of FIG. 2). The short-circuit judgment unit 14 judges that at least one of the capacitors $C_1$ to $C_n$ in the DC link unit 12 has shorted when it detects that the value of the input current flowing from the AC power supply 2 into the DC link unit 12 via the converter 11 is larger than the second threshold $th_2$. As will be described later, a stop unit 15 which stops driving the motor 3 when the short-circuit judgment unit 14 judges that at least one of the capacitors $C_1$ to $C_n$ has shorted is provided on the downstream side of the short-circuit judgment unit 14, and stopping driving the motor 3 by the stop unit 15 at, e.g., time t2 can release the capacitors having no short-circuit failure from the high voltage state and gradually drop the DC link unit voltage, thus avoiding any additional failure such as breakage or firing.

In the conventional motor drive apparatus, with the motor driven by controlling the power conversion operation of the inverter, as illustrated in FIG. 3, when short-circuit failure occurs at, e.g., time $t_1$ in one of the series-connected capacitors provided in the DC link unit, a voltage higher than that before time $t_1$ is applied to capacitors having no short-circuit failure, the input current flows from the AC power supply into the converter (the waveform in the lower part of FIG. 3), and the voltages of the capacitors having no short-circuit failure rises (the waveform in the upper part of FIG. 3). After that, the capacitors having no short-circuit failure remain in the high voltage applied state for a certain period of time, breakage or firing occurs and a short-circuit, in turn, occurs even in the capacitors having no short-circuit failure at time t2 (the waveform in the upper part of FIG. 3), all the capacitors having no short-circuit failure also similarly short, and the DC link unit voltage becomes zero so that a high current flows (the waveform in the lower part of FIG. 3).

The value of the DC link unit voltage used in short-circuit judgment processing by the short-circuit judgment unit 14 is measured by the voltage measurement unit 16. The voltage measurement unit 16 need only employ, e.g., a voltage measurement device generally provided to measure the value of the DC link unit voltage used in voltage control of the capacitors $C_1$ to $C_n$ of the DC link unit 12, and no new voltage measurement unit 16 may be separately provided. The voltage measurement unit 16 need only be provided at a position which allows measurement of the value of the DC link unit voltage, i.e., the voltage applied to the positive and negative bipolar terminal of the DC link unit 12, and is provided at, e.g., a position (the interval between the converter 11 and the set of capacitors $C_1$ to $C_n$) illustrated in FIG. 1 or a position A (the interval between the capacitors $C_1$ to $C_n$ and the inverter 13).

The value of the above-mentioned input current used in short-circuit judgment processing by the short-circuit judgment unit 14 is measured by the input current measurement unit 17. The input current measurement unit 17 need only employ, e.g., a current measurement device generally provided to measure the value of the input current used in voltage control of the capacitors $C_1$ to $C_n$ of the DC link unit 12 or power conversion control of the converter 11 (especially when the converter 11 serves as a PWM-control rectifier circuit), and no new input current measurement unit 17 may be separately provided. The input current measurement unit 17 need only be implemented as a current measurement device provided at a position which allows measurement of the value of the input current flowing from the AC power supply 2 into the DC link unit 12 via the converter 11. In an example, the value of an alternating current flowing from the AC power supply 2 into the converter 11 may be measured using a current measurement device provided at a position illustrated in FIG. 1 as the input current measurement unit 17. In another example, the value of a direct current flowing from the converter 11 into the DC link unit 12 may be measured using a current measurement device provided at a position B-1 or B-2 as the input current measurement unit 17. In this manner, the "input current flowing from the AC power supply 2 into the DC link unit 12 via the converter 11" measured by the input current measurement unit 17 is an alternating current when the input current measurement unit 17 is located on the AC input side of the converter 11, and is a direct current when the input current measurement unit 17 is located on the DC output side of the converter 11.

The stop unit 15 stops driving the motor 3 when the short-circuit judgment unit 14 judges that at least one of the capacitors $C_1$ to $C_n$ has shorted. The stop unit 15 stops driving the motor 3 by outputting, e.g., a shut-off command (open command) to a magnetic contactor 18 generally provided to open and close the electric path between the motor drive apparatus 1 and the AC power supply 2, as illustrated in FIG. 1, opening the contact point of the magnetic contactor 18, and shutting off power supply from the AC power supply 2 to the motor drive apparatus 1. Alternatively, the stop unit 15 may stop driving the motor 3 by outputting, e.g., a command to stop the power conversion operation to the inverter 13 and stopping power supply to the motor 3 by the inverter 13.

FIG. 4 is a flowchart illustrating the operation sequence of the motor drive apparatus according to an embodiment of the present disclosure.

In the motor drive apparatus 1 according to this embodiment, when the motor 3 is driven by controlling the power conversion operation of the inverter 13 by the motor control unit 20, in step S101, to determine whether the value of the DC link unit voltage has temporarily considerably dropped, the short-circuit judgment unit 14 compares the value of the DC link unit voltage, i.e., the voltage applied to the positive and negative bipolar terminal of the DC link unit 12 with a predefined first threshold $th_1$ and judges whether the value of the DC link unit voltage is smaller than the first threshold $th_1$. When the short-circuit judgment unit 14 judges in step S101 that the value of the DC link unit voltage is smaller than the first threshold $th_1$, the process advances to step S102.

In step S102, the short-circuit judgment unit 14 judges whether the value of the input current flowing from the AC power supply 2 into the DC link unit 12 via the converter 11 is larger than a second threshold $th_2$. When the short-circuit judgment unit 14 does not judge in step S102 that the value of the input current is larger than the second threshold $th_2$, the process returns to step S101.

When the short-circuit judgment unit 14 judges in step S102 that the value of the input current is larger than the second threshold $th_2$, the process advances to step S103. Since advancement to step S103 corresponds to the case where, when the value of the DC link unit voltage is smaller than the first threshold $th_1$ (i.e., when the value of the DC link unit voltage temporarily considerably drops), the value of the input current flowing from the AC power supply 2 into the DC link unit 12 via the converter 11 is larger than the second threshold $th_2$, the short-circuit judgment unit 14 judges that at least one of the capacitors $C_1$ to $C_n$ in the DC link unit 12 has shorted.

In step S104, the stop unit 15 stops driving the motor 3.

The short-circuit judgment unit 14, the stop unit 15, and the motor control unit 20 may be constructed in, e.g., software program form, or may be constructed as a combination of various electronic circuits and a software program. In this case, the function of each unit can be implemented by causing an arithmetic processing unit such as an ASIC or a DSP to operate the software program. In the above-described embodiment, the short-circuit judgment unit 14 and the stop unit 15 are provided in the motor control unit 20, but instead, the function of each unit may be implemented by causing an arithmetic processing unit such as an ASIC or a DSP located outside the motor control unit 20 to execute the above-described software program, or may be implemented as a semiconductor integrated circuit in which a software program for implementing the functions of the short-circuit judgment unit 14 and the stop unit 15 is written.

The voltage measurement unit 16 that measures the DC link unit voltage used in short-circuit judgment processing by the short-circuit judgment unit 14 need only employ, e.g., a voltage measurement device generally provided to measure the value of the DC link unit voltage used in voltage control of the capacitors $C_1$ to $C_n$ of the DC link unit 12, and no new voltage measurement device may be separately provided. The input current measurement unit 17 that measures the value of the above-mentioned input current used in short-circuit judgment processing by the short-circuit judgment unit 14 need only employ, e.g., a current measurement device generally provided to measure the value of the input current used in voltage control of the capacitors $C_1$ to $C_n$ of the DC link unit 12 or power conversion control of the converter 11 (especially when the converter 11 serves as a PWM-control rectifier circuit), and no new input current measurement device may be separately provided. According to this embodiment, short-circuit failure of series-connected capacitors provided in a DC link unit between a converter and an inverter in a motor drive apparatus can be detected at low cost without an additional circuit.

According to one aspect of the present disclosure, a motor drive apparatus capable of detecting short-circuit failure of series-connected capacitors provided in a DC link unit between a converter and an inverter at low cost without an additional circuit can be achieved.

The invention claimed is:

1. A motor drive apparatus comprising:
   a converter configured to convert AC power input from an AC power supply into DC power and outputs the DC power;
   a DC link unit comprising a plurality of capacitors connected in parallel with a DC output of the converter and connected in series with each other;
   an inverter connected in parallel with the DC link unit, and configured to convert the DC power in the DC link unit into AC power for driving a motor, and outputs the AC power; and
   a short-circuit judgment unit configured to compare a value of a voltage applied to a positive and negative bipolar terminal of the DC link unit with a predefined first threshold, further compare a value of an input current flowing from the AC power supply into the DC link unit via the converter with a predefined second threshold, and judge that at least one of the plurality of capacitors in the DC link unit has shorted in a case where, when, as a result of comparison, the value of the voltage applied to the positive and negative bipolar terminal of the DC link unit is smaller than the first threshold, the value of the input current flowing from the AC power supply into the DC link unit via the converter is larger than the second threshold.

2. The motor drive apparatus according to claim 1, wherein the first threshold is set to detect a temporary drop in the value of the voltage applied to the positive and negative bipolar terminal of the DC link unit.

3. The motor drive apparatus according to claim 2, wherein the second threshold is set to detect an increase in the value of the input current flowing from the AC power supply into the DC link unit via the converter.

4. The motor drive apparatus according to claim 3, wherein the second threshold is set to a value larger than the input current flowing from the AC power supply into the DC link unit via the converter, which increases due to pulsation in a steady state during driving of the motor.

5. The motor drive apparatus according to claim 1, further comprising a stop unit configured to stop driving the motor when the short-circuit judgment unit judges that at least one of the plurality of capacitors has shorted.

6. The motor drive apparatus according to claim 1, further comprising a voltage measurement unit configured to measure the value of the voltage applied to the positive and negative bipolar terminal of the DC link unit.

7. The motor drive apparatus according to claim 1, further comprising an input current measurement unit configured to measure a value of an alternating current flowing from the AC power supply into the converter as the value of the input current.

8. The motor drive apparatus according to claim 1, further comprising an input current measurement unit configured to measure a value of a direct current flowing from the converter into the DC link unit as the value of the input current.

* * * * *